United States Patent
Saiki et al.

(10) Patent No.: US 7,041,715 B2
(45) Date of Patent: May 9, 2006

(54) PLASTISOL COMPOSITION AND MOLDED OBJECT AND ARTICLE EACH OBTAINED THEREFROM

(75) Inventors: Shinji Saiki, Aichi (JP); Toshihiro Kasai, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 10/450,250

(22) PCT Filed: May 23, 2002

(86) PCT No.: PCT/JP02/05015

§ 371 (c)(1),
(2), (4) Date: Jun. 12, 2003

(87) PCT Pub. No.: WO02/094940

PCT Pub. Date: Nov. 28, 2002

(65) Prior Publication Data

US 2004/0053065 A1    Mar. 18, 2004

(30) Foreign Application Priority Data

May 23, 2001  (JP) ............................. 2001-154246

(51) Int. Cl.
*C08L 101/00* (2006.01)
(52) U.S. Cl. ...................... 523/201; 524/143; 524/296; 428/522
(58) Field of Classification Search ................ 428/522; 523/201; 524/143, 296
See application file for complete search history.

(56) References Cited

U.S. PATENT DOCUMENTS

| 4,199,486 | A | * | 4/1980 | Boessler et al. ............ 523/201 |
| 5,393,801 | A | | 2/1995 | Nakamura et al. |
| 5,441,994 | A | * | 8/1995 | Moriga et al. ............... 523/201 |
| 5,965,645 | A | * | 10/1999 | Beck et al. .................. 524/197 |
| 6,204,321 | B1 | * | 3/2001 | Lanoye ........................ 524/571 |
| 2004/0072925 | A1 | * | 4/2004 | Saiki et al. ................. 523/201 |

FOREIGN PATENT DOCUMENTS

| JP | 6-322218 | 11/1994 |
| JP | 8-510277 | 10/1996 |
| WO | 95/16741 | 6/1995 |

OTHER PUBLICATIONS

Patent Abstracts of Japan, JP 56-082838, Jul. 6, 1981.
Derwent Publications, AN 1995-358599, XP-002301874, JP 07-268154, Oct. 17, 1995.

* cited by examiner

*Primary Examiner*—D. Lawrence Tarazano
(74) *Attorney, Agent, or Firm*—Oblon, Spivak, McClelland, Maier & Neustadt, P.C.

(57) ABSTRACT

A plastisol composition comprising (A) polymer fine particles comprising a polymer (a1) which undergoes a chemical reaction upon heating whereby it is converted from incompatibility to compatibility with a plasticizer (B), (B) a plasticizer, and (C) a reactive component which chemically reacts with the polymer (a1) upon heating to convert the polymer (a1) from incompatibility to compatibility with the plasticizer (B). The composition has satisfactory storage stability, exhibits no bleed-out of the plasticizer after heating, and gives molded products with excellent mechanical properties.

19 Claims, No Drawings

PLASTISOL COMPOSITION AND MOLDED OBJECT AND ARTICLE EACH OBTAINED THEREFROM

TECHNICAL FIELD

The present invention relates to a plastisol composition and to molded products and articles obtained using it. More particularly, the invention relates to a plastisol composition which has satisfactory storage stability, which does not suffer bleed-out of the plasticizer after heating and which gives molded products with excellent mechanical properties. The invention also relates to molded products and articles obtained using the plastisol composition.

BACKGROUND ART

Plastisol compositions obtained by dispersing polymer fine particles in a plasticizer, known as paste resins, are currently in wide used in industry for numerous uses such as coatings for automobiles, flooring materials, wallpaper, steel sheets and the like or as molding materials for slush molding, dip molding and rotation molding, and the most commonly used are vinyl chloride sols employing vinyl chloride resins as the polymer fine particles.

However, vinyl chloride resins are associated with the problem of production of the toxic substance dioxin when incinerated at low temperatures. In order to avoid this problem, acrylic sols, using acrylic-based resins as the polymer fine particles, have been proposed as substitute plastisol compositions in place of vinyl chloride sols.

For example, Japanese Unexamined Patent Publication No. 7-233299 discloses polymer fine particles, used in an acrylic sol composition, which are particles having a core/shell structure with a plasticizer-compatible core section and a plasticizer-incompatible shell section. These have been proposed because particles having such a structure offer improved storage stability in a sol state, and when the sol composition is coated and heated to form a gelled film, the morphology of the polymer fine particles is altered in such a manner as to improve mechanical properties of molded products obtained after heating.

In recent years, however, the specifications for the mechanical properties of molded products obtained using plastisol compositions have become even more demanding.

Japanese Unexamined Patent Publication No. 9-77950 proposes an acrylic sol comprising polymer particles composed of a copolymer consisting of a hydroxyl group-containing methacrylate and a different copolymerizable monomer, but it has not yet been possible to achieve coatings with sufficient mechanical properties even using this acrylic sol.

Thus, although acrylic sols using polymer fine particles with various structures have been proposed, it is still the case that non-vinyl chloride based plastisol compositions with very excellent mechanical properties, and which can substitute for vinyl chloride sols, have not yet been obtained.

DISCLOSURE OF THE INVENTION

It is an object of the present invention to solve the aforementioned problems of the prior art by providing a novel plastisol composition which produces no harmful gases when incinerated, exhibits satisfactory storage stability and gives heated molded products with excellent mechanical properties.

As a result of much diligent research on the aforementioned problems, the present inventors have completed the invention upon finding that, by using polymer fine particles comprising a polymer which undergoes a chemical reaction upon heating whereby it is converted from incompatibility to compatibility with the plasticizer, it is possible to vastly improve the mechanical properties of coatings and molded products obtained by hot film formation of the plastisol composition.

Specifically, the present invention provides a plastisol composition comprising (A) polymer fine particles comprising a polymer (a1) which undergoes a chemical reaction upon heating whereby it is converted from incompatibility to compatibility with a plasticizer (B), (B) a plasticizer, and (C) a reactive component which chemically reacts with the polymer (a1) upon heating to convert the polymer (a1) from incompatibility to compatibility with the plasticizer (B), as well as molded products and articles obtained using the plastisol composition.

BEST MODE FOR CARRYING OUT THE INVENTION

The polymer fine particles (A) used for the invention are particles comprising a polymer (a1) which undergoes a chemical reaction upon heating whereby it is converted from incompatibility to compatibility with the plasticizer (B).

Because the polymer fine particles (A) are polymer fine particles for a plastisol composition, they must be incompatible with the plasticizer (B) at least at room temperature. This is necessary in order to achieve storage stability of the plastisol composition in which the polymer fine particles (A) and plasticizer (B) are combined.

According to the invention, the standard for judging compatibility of the polymer (a1) with the plasticizer (B) is as follows.

The polymer (a1) and plasticizer (B) are combined in a weight ratio of 100:100 and coated onto a glass plate as a film to obtain a coating, and the surface of the coating after standing at room temperature for 24 hours is visually evaluated. If no bleed-out of the plasticizer from the surface of the coating is observed, the polymer (a1) is judged to be "compatible", and if bleed-out of the plasticizer from the surface of the coating is observed, polymer (a1) is judged to be "incompatible".

Confirmation of conversion of polymer (a1) from incompatibility to compatibility with the plasticizer (B) by chemical reaction upon heating is made based on the following standard.

The polymer (a1) and plasticizer (B) are combined in a weight ratio of 100:100 and the reactive component (C) is added in an equimolar amount to the reactive functional group of polymer (a1), the mixture is then coated onto a glass plate and heated under chemical reaction conditions to obtain a coating, and then the surface of the coating after standing at room temperature for 24 hours is visually evaluated. If no bleed-out of the plasticizer from the surface of the coating is observed, polymer (a1) is judged to be "converted to compatible", and if bleed-out of the plasticizer from the surface of the coating is observed, polymer (a1) is judged to be "not converted to compatible".

The "chemical reaction conditions" referred to above are the conditions necessary for a chemical reaction to proceed between the polymer (a1) and the reactive component (C).

The process rate of the chemical reaction will normally be about 40% or greater, although this will differ depending on the combination of the polymer (a1) and the reactive component (C) selected. It will sometimes therefore be necessary for the chemical reaction to proceed to about 70–80%.

The conditions for the process of the chemical reaction will also differ depending on the combination of the polymer (a1) and the reactive component (C) selected, and therefore cannot be specified.

As a specific example, when using a polymer with epoxy groups as the polymer (a1) and a nucleophile or electrophile as the reactive component (C), the reaction conditions may be set to 140–180° C. for 10-30 minutes for the chemical reaction between the polymer (a1) and the reactive component (C) to proceed to approximately 50%.

When the polymer fine particles (A) have a multilayered structure such as a core/shell structure, polymers with simple structures having the same components and compositions as each layer are prepared separately, and the compatibility or incompatibility with the plasticizer is judged for each layer based on the aforementioned judging standard.

The type of polymer composing the polymer fine particles (A) is not particularly restricted so long as it comprises the polymer (a1), but it is preferably a polymer from which no harmful gases are generated upon incineration of the coating obtained by heating the plastisol composition.

Examples of polymers that may be used as constituent components of the polymer fine particles (A) include widely employed polymers such as acrylic polymers, styrene-based polymers, butadiene-based polymers, vinyl acetate-based polymers and the like. In addition, their copolymers, such as styrene-butadiene copolymers, acrylonitrile-butadiene copolymers, acrylic acid-vinyl acetate copolymers and the like may also be used. The polymers may be selected depending on the performance and usage desired for the coating.

Acrylic polymers and acrylic acid-vinyl acetate copolymers are preferred because of their excellent compatibility with plasticizers and minimal load on the environment. In cases where high rubber elasticity is required, it is preferred to use styrene-butadiene copolymer alone or in combination with an acrylic polymer or acrylic acid-vinyl acetate copolymer.

According to the invention, the polymer (a1) in the polymer fine particles (A) may be any polymer with at least one type of reactive functional group, and if necessary it may be a polymer with two or more reactive functional groups.

The polymer (a1) in the polymer fine particles (A) is incompatible with the plasticizer (B), but upon heating undergoes a chemical conversion to a component which is compatible with the plasticizer.

Using polymer fine particles comprising the polymer (a1), which is incompatible with the plasticizer at room temperature, will produce a plastisol composition with excellent storage stability, and since heating converts the polymer (a1) from an incompatible to a compatible compound, the incompatible component in the coating disappears, thereby notably improving the plasticizer retention of the obtained coating and vastly enhancing the mechanical properties.

Although any of the polymers mentioned above may be used as the polymer (a1) with no particular restrictions, acrylic-based polymers are preferred to facilitate introduction of the reactive functional group necessary for chemical conversion of the polymer (a1) for compatibility with the plasticizer, and because of their practicality.

As specific examples for the polymer (a1) there may be mentioned simple polymers of compounds having a reactive functional group (a1-1) or their copolymers with compounds other than compounds having a reactive group (a1-1), and copolymerizable therewith (a1-2).

The compound having a reactive functional group (a1-1) referred to here is not particularly restricted, and it is a compound having at least one reactive functional group.

As specific examples for the compound having a reactive functional group (a1-1) there may be mentioned epoxy group-containing monomers such as glycidyl (meth)acrylate, carboxyl group-containing monomers such as methacrylic acid, acrylic acid, itaconic acid, crotonic acid, maleic acid, fumaric acid, 2-succinoloyloxyethyl methacrylate-2-methacryloyloxyethylsuccinic acid, 2-maleinoloyloxyethyl methacrylate-2-methacryloyloxyethylmaleic acid, 2-phthaloyloxyethyl methacrylate-2-methacryloyloxyethylphthalic acid and 2-hexahydrophthaloyloxyethyl methacrylate-2-methacryloyloxyethylhexahydrophthalic acid, sulfonic acid group-containing monomers such as allylsulfonic acid, carbonyl group-containing (meth)acrylates such as acetoacetoxyethyl (meth)acrylate, hydroxyl group-containing (meth)acrylates such as 2-hydroxyethyl (meth)acrylate and 2-hydroxypropyl (meth)acrylate, cyclic ether group-containing (meth)acrylates such as tetrahydrofurfuryl (meth)acrylate, amino group-containing (meth)acrylates such as N-dimethylaminoethyl (meth)acrylate and N-diethylaminoethyl (meth)acrylate, or as acrylamides and their derivatives, for example, diacetoneacrylamide, N-methylolacrylamide, N-methoxymethylacrylamide, N-ethoxymethylacrylamide and N-butoxymethylacrylamide, as well as urethane-modified acrylates, epoxy-modified acrylates, silicone-modified acrylates and the like.

These may be used alone or in combinations of two or more. They may be appropriately selected as desired.

According to the invention, epoxy group-containing monomers and hydroxyl group-containing (meth)acrylates are particularly preferred in terms of industrial practicality, because they can easily react for conversion to compatibility and because they are readily available.

On the other hand, the copolymerizable compound (a1-2) other than compound (a1-1) is not particularly restricted so long as it is a compound that copolymerizes with the compound having a reactive functional group (a1-1), and for example, a known alkyl methacrylate and/or alkyl acrylate monomer may be polymerized to produce a polymer other than polymer (a1).

As specific examples for compound (a1-2) there may be mentioned known alkyl methacrylate and/or alkyl acrylate monomers including (meth)acrylates of linear alkyl alcohols such as methyl (meth)acrylate, ethyl (meth)acrylate, n-butyl (meth)acrylate, i-butyl (meth)acrylate, hexyl (meth)acrylate, 2-ethylhexyl (meth)acrylate and octyl (meth)acrylate, (meth)acrylates of cyclic alkyl alcohols such as cyclohexyl (meth)acrylate, and polyfunctional (meth)acrylates such as (poly)ethyleneglycol di(meth)acrylate, propyleneglycol di(meth)acrylate, 1,6-hexanediol di(meth)acrylate and trimethylolpropane tri(meth)acrylate.

These may be used alone or in combinations of two or more. Also, the monomers that are useful for the invention are not limited to the monomers mentioned above.

The term "(meth)acrylate" as used throughout the present specification refers to methacrylate and acrylate.

Particularly preferred according to the invention are methyl (meth)acrylate, n-butyl (meth)acrylate, i-butyl (meth)acrylate and 2-ethylhexyl (meth)acrylate, because they produce coatings with excellent mechanical properties, are readily available, and have high practical utility in the industry.

By appropriate selection of these known alkyl (meth) acrylates based on their compatibility with plasticizers, they may also be used as monomers for production of polymer fine particles having a multilayer structure, such as a core/shell structure composed of a core polymer and a shell polymer as described below.

The polymer fine particles (A) used for the invention may, if necessary, contain a polymer other than polymer (a1).

In order to obtain a polymer other than polymer (a1), any of the aforementioned known alkyl methacrylate and/or alkyl acrylate monomers may be appropriately selected for polymerization.

According to the invention, there are no particular restrictions on the combination of polymer (a1) with the reactive component (C) for chemical reaction to convert polymer (a1) from incompatibility to compatibility with the plasticizer, and it may be appropriately selected to be suitable for a known chemical reaction.

For example, from the standpoint of convenience or productivity for industrial use, it is preferred to employ an addition reaction between an epoxy group and a nucleophile or electrophile, or an addition reaction between a hydroxyl group and an isocyanate.

Specifically, in the case of the former addition reaction, the plastisol composition may be produced by selecting a polymer with a side chain epoxy group as polymer (a1) and a nucleophile or electrophile as the reactive component (C).

In the case of the latter addition reaction, the plastisol composition may be produced by selecting a polymer with a side chain hydroxyl group as polymer (a1) and an isocyanate as the reactive component (C).

There are no particular restrictions on the degree of copolymerization of the compound with a reactive functional group in polymer (a1), but it is preferably at least 5 mole percent and more preferably at least 10 mole percent for excellent reactivity with the reactive component (C).

While no particular restrictions are placed on the upper limit, it is preferably no greater than 80 mole percent and more preferably no greater than 50 mole percent from the standpoint of productivity for emulsion polymerization.

Moreover, there are no particular restrictions on the conditions for chemical conversion of polymer (a1) from incompatibility to compatibility with the plasticizer.

Specifically, the conditions are not particularly restricted so long as the polymer (a1) which is incompatible with the plasticizer at room temperature is converted to be compatible with the plasticizer through some chemical reaction at a temperature of from about 30° C. to about 100° C.

The temperature for the chemical reaction is preferably at least 50° C. and more preferably at least 80° C. from the standpoint of storage stability of the plastisol composition. From the standpoint of allowing the chemical reaction to occur simultaneously with film formation of the plastisol composition, the temperature is preferably no higher than 200° C. and more preferably no higher than 160° C.

The structure of the polymer fine particles (A) used for the invention is not particularly restricted, and it may be appropriately selected in consideration of achieving both compatibility with the plasticizer and storage stability of the sol composition.

As specific examples of particle structures there may be mentioned simple structures in which the components and composition are homogeneous, a core/shell structure composed of two layers of a core polymer and a shell polymer, a multilayer structure composed of 3 or more layers, or a gradient-type structure with extremely thin layers for nearly continuously gradual change of the composition.

Polymer fine particles with a simple structure or polymer fine particles with a core/shell structure are preferred from the standpoint of ease of preparing the polymer fine particles.

According to the invention, the outermost layer of the polymer fine particles (A) preferably consists of polymer (a1) from the standpoint of storage stability of the plastisol composition.

Specifically, for example, in the case of a simple structure of the polymer fine particles, the polymer fine particles may consist of the polymer (a1) alone, or in the case of a multilayer structure of two or more layers, the polymer fine particles may comprise a core section which is compatible with the plasticizer, with at least the outermost layer consisting of the polymer (a1).

There are no particular restrictions on the nature of the polymer fine particles (A), which may be primary particles, or alternatively the primary particles may have a secondary or higher structure to obtain a particle structure designed according to the purpose and requirements.

Specifically, they may have a secondary structure such as that of secondary particles composed of weakly aggregated primary particles, secondary particles composed of strongly aggregated primary particles, or secondary particles composed of primary particles fused together by heating. Such secondary particles may additionally have an even higher order structure obtained by treatment such as granulation. Polymer fine particles (A) with a higher order structure are particularly suitable when it is desired to prevent dusting of the polymer fine particles, improve the workability by increased fluidity and the like or improve the physical properties for better dispersion of the polymer fine particles in the plasticizer.

The method of producing the polymer fine particles (A) for the invention is not particularly restricted, and any known method may be employed. Specifically, the particles may be produced using polymerization techniques such as, for example, emulsion polymerization, seed emulsion polymerization, soap-free polymerization, suspension polymerization, microsuspension polymerization or the like, in an aqueous medium. Instead of polymerization in an aqueous medium there may be utilized dispersion polymerization in an organic medium or dispersion polymerization in an aqueous/organic mixed medium, or precipitation polymerization in an organic medium. Depending on the purpose, these polymerization techniques may also be used in various combinations.

Emulsion polymerization, seed emulsion polymerization and soap-free polymerization are practical for use when it is desired to control the particle structure such as for core/shell particles. These methods are preferred from the standpoint of obtaining polymer fine particles of high molecular weight and producing coatings with satisfactory physical properties. Microsuspension polymerization is also preferred from the standpoint of relatively easily obtaining polymer fine particles with a specific surface area in the optimum range, and from the standpoint of allowing introduction of a core/shell structure into the polymer fine particles (A) by post-treatment such as alkali hydrolysis after polymerization.

There are no particular restrictions on the method of recovering the polymer from the polymerization dispersion obtained by such polymerization techniques, and common methods such as spray drying, coagulation, lyophilization, centrifugal separation and filtration may be employed. Spray drying is superior from the standpoint of facilitating control of the particle properties and increasing productivity.

The plasticizer (B) used for the invention is not particularly restricted, and any known plasticizer may be used. As specific examples for the plasticizer (B) there may be mentioned plasticizers based on dialkyl phthalates such as dibutyl phthalate, dihexyl phthalate, dioctyl phthalate, diisononyl phthalate and diisodecyl phthalate, alkylbenzyl phthalates such as butylbenzyl phthalate, alkylaryl phthalates, dibenzyl phthalates, diaryl phthalates, alkylsulfonic acid esters, triaryl phosphates such as tricresyl phosphate, trialkyl phosphates, alkylaryl phosphates, benzoic acid esters, adipic acid esters, polyesters, soybean oils such as epoxidated soybean oil, and liquid polymers. These plasticizers may be used alone or in combinations of two or more, depending on the purpose.

The desired plastisol composition may be obtained by appropriate selection of the properties of the plasticizer, such as resistance to low-temperatures, flame retardance, oil resistance, low viscosity and low thixotropy. Phthalic acid ester-based, alkylsulfonic acid ester-based and polyester-based plasticizers are preferred for practical reasons, including commercial availability and economy, as well as workability.

The reactive component (C) used for the invention is an essential component for chemical reaction with the reactive functional group on the side chain of the polymer (a1) in the polymer fine particles (A) upon heating to convert the polymer (a1) from incompatibility to compatibility with the plasticizer (B).

The reactive component (C) is not particularly restricted so long as it is a component which chemically reacts with the reactive functional group on the side chain of the polymer (a1), but a monofunctional compound is preferably used for superior plasticizer retention of the obtained coating.

As specific examples for the reactive component (C) there may be mentioned nucleophiles or electrophiles, such as carboxylic acids, secondary amines and thiols, as well as isocyanates.

More specifically, when using polymer fine particles (A) comprising a polymer (a1) with an epoxy group as the reactive functional group, for example, a nucleophile or electrophile which chemically reacts with the epoxy group may be used as the reactive component (C).

There are no particular restrictions on the nucleophile or electrophile, but carboxylic acids, secondary amines and thiols are preferred from the standpoint of reactivity with the epoxy group, among which higher fatty acids such as 2-ethylhexanoic acid, 3,5,5-trimethylhexanoic acid, oleic acid and isostearic acid or secondary amines such as dibutylamine and di-(2-ethylhexyl)amine are especially preferred.

When using polymer fine particles (A) comprising a polymer (a1) with a hydroxyl group as the reactive functional group, it is preferred to use an isocyanate which chemically reacts with the hydroxyl group, as the reactive component (C). The isocyanate in this case is not particularly restricted, but from the standpoint of storage stability of the plastisol composition it is preferred to use a block isocyanate having the isocyanate group protected with a blocking agent.

According to the invention, the plastisol composition may comprise two or more reactive functional groups on side chains of the polymer (a), and two or more reactive components (C).

Specifically, the plastisol composition may contain (A) polymer fine particles having an epoxy group and hydroxyl group as reactive functional groups in the polymer (a1), (B) a plasticizer, and a carboxylic acid, secondary amine, thiol or isocyanate as the reactive component (C).

When such a plastisol composition is heated under chemical reaction conditions, an addition reaction occurs between the epoxy group as the reactive functional group of the polymer fine particles (A) and the carboxylic acid as the reactive component (C), producing a hydroxyl group. The produced hydroxyl group may also be utilized as a reactive component (C) which chemically reacts with an isocyanate in the polymer fine particles (A).

If necessary, the plastisol composition of the invention may contain as appropriate an added reaction catalyst to accelerate the reaction between the polymer (a1) component and the reactive component (C), or an added dissociation catalyst when a block isocyanate is used.

Depending on the purpose of use, the plastisol composition of the invention may also include various other addition agents or materials. For example, there may be optionally added filling materials such as calcium carbonate, aluminum hydroxide, baryta, clay, colloidal silica, mica powder, silica sand, diatomaceous earth, kaolin, talc, bentonite, glass powder or aluminum oxide, pigments such as titanium oxide or carbon black, diluents such as mineral terpenes or mineral spirits, as well as defoaming agents, mildew proofing agent, deodorants, antibacterial agents, surfactants, lubricants, ultraviolet absorbers, aromatics, foaming agents, leveling agents, adhesives and the like.

Molded products and articles according to the invention will now be explained.

A molded product according to the invention is a molded product obtained by hot molding the plastisol composition described above. The molding method used is not particularly restricted, and a known method such as dip molding, slush molding, rotation molding, cast molding, immersion molding or the like may be used.

As specific examples of molded products there may be mentioned fake leather, films, gloves, toys, miscellaneous goods, industrial parts, electrical insulating parts, automobile interior materials and the like.

An article according to the invention is an article having a coating obtained by heating the plastisol composition described above.

As examples of coated articles there may be mentioned, specifically, automobile parts coated with the aforementioned plastisol composition as an undersealing material, as a hood lighting adhesive, as a sill-protecting compound or as a spot-welding paste, as well as for other adhesive uses. There may also be mentioned the use of the plastisol composition in the packaging industry, as a crown cork used to seal container closures, or as a seam sealant for tin cans.

The plastisol composition may also be used for numerous other industrial purposes, such as a wall covering, floor finishing material, or as an adhesive for laminated glass.

There are no particular restrictions on the method of applying the plastisol composition onto an object to obtain an article according to the invention, and for example, there may be mentioned known methods such as knife coating, comma coating, gravure printing, roll coating, rotary silk printing, reverse coating, spray painting, screen coating and the like.

The present invention will now be explained in greater detail through the following examples. The "parts" in the examples refer to parts by weight; the evaluations were conducted according to the following methods.

viscosity

The obtained plastisol composition was adjusted to a temperature of 25° C. in a thermostatic water bath, and a BM viscometer (Rotor No.3, product of Toki Sangyo Co., Ltd.) was used to measure the viscosity at 6 rpm (units: Pa·s)

Storage Stability

The plastisol composition was kept insulated in a thermostatic chamber at 30° C. for 1 week and then removed, and the viscosity was again measured at 20° C. (BM viscometer, Rotor No.3, 6 rpm, product of Toki Sangyo Co., Ltd.). The thickening rate of the plastisol composition was calculated according to the following formula, and the storage stability was evaluated based on the following scale (units: %).

{(viscosity after storage/initial viscosity)−1}×100(%)

⊚: <40
○: ≧40 and <60
Δ: ≧60 and <100
X: ≧100

Plasticizer Retention

A test sample glass plate coated with the plastisol composition was heated, and the coating obtained by gelling was cooled to room temperature and allowed to stand for 24 hours and then visually evaluated.

○: Satisfactory plasticizer retention, with no observable bleed-out of the plasticizer on the coating surface.

X: Observable bleed-out of the plasticizer on the coating surface.

Strength

The obtained coating was peeled from the glass plate and cut into a No.3 dumbbell shape according to the procedure of JIS K-7113 to prepare a test sample, and the coating strength was measured with a Tensilon measuring instrument (units: MPa). The testing speed was 200 mm/min, the load cell rating was 980 N, and the environment temperature for measurement was 25° C.

Rubber Elasticity

The plastisol composition was coated onto a glass plate to a thickness of 2 mm, and heated and gelled to obtain a uniform film. This was then cut into 100 mm×15 mm test samples for a repeated tensile test using a Tensilon measuring instrument with a clamp separation distance of 50 mm, a testing speed of 50 mm/min and a pull length of 20 mm. The rubber elasticity was calculated from the 2nd cycle hysteresis curve of the resulting displacement-stress curve according to the following formula, and evaluation was made based on the following scale (units: %).

(Work during restoration/work during pulling)×100 (%)

⊚: ≧70
○: ≧50 and <70
Δ: ≧40 and <50
X: <30

PRODUCTION EXAMPLE 1

Preparation of Polymer Fine Particles (A1)

After placing 500 g of purified water in a 2-liter 4-necked flask equipped with a thermometer, a nitrogen gas introduction tube, a stirring rod, a dropping funnel and a cooling tube, nitrogen gas was sufficiently bubbled through for 30 minutes for exchange of the dissolved oxygen in the purified water with nitrogen. After then stirring at 200 rpm while blowing in nitrogen gas, the temperature was raised to 80° C. Once the internal temperature reached 80° C., 0.25 g of potassium persulfate dissolved in 10 g of purified water was added thereto at once.

Next, a monomer emulsion (a stirred, emulsified mixture of 340.6 g of methyl methacrylate, 159.4 g of glycidyl methacrylate, 5.00 g of sodium dioctylsulfosuccinate (PELEX O-TP, trade name of Kao Corp.) and 250.0 g of purified water) was added dropwise thereto over a period of 5 hours, and stirring was continued at 80° C. for 1 hour to obtain a polymer dispersion.

After cooling the obtained polymer dispersion to room temperature, a spray drier (Model L-8 by Okawara Kakoki Co., Ltd.) was used for spray drying at an inlet temperature of 170° C., an outlet temperature of 75° C. and an atomizer speed of 25,000 rpm, to obtain polymer fine particles (A1). Table 1 shows the results of evaluating the obtained polymer fine particles (A1).

PRODUCTION EXAMPLES 2–4

Preparation of Polymer Fine Particles (A2)–(A4)

The procedure described in Production Example 1 was repeated, except that the monomers for the dropwise added monomer emulsion had the respective compositions shown in Table 1 at 500 g, to obtain polymer fine particles (A2)-(A4). Table 1 shows the results of evaluating the obtained polymer fine particles (A2)–(A4).

PRODUCTION EXAMPLE 5

Preparation of Polymer Fine Particles (A5)

After placing 500 g of purified water in a 2-liter 4-necked flask equipped with a thermometer, a nitrogen gas introduction tube, a stirring rod, a dropping funnel and a cooling tube, nitrogen gas was sufficiently bubbled through for 30 minutes for exchange of the dissolved oxygen in the purified water with nitrogen. After changing the nitrogen gas to a flow, 12.9 g of methyl methacrylate and 12.1 g of n-butyl methacrylate were added and the temperature was raised to 80° C. while stirring at 200 rpm. Once the internal temperature reached 80° C., 0.25 g of potassium persulfate dissolved in 10 g of purified water was added thereto at once, and soap-free polymerization was commenced. The stirring was continued at 80° C. for 60 minutes to obtain a seed particle dispersion.

Next, a monomer emulsion (a stirred, emulsified mixture of 146.2 g of methyl methacrylate, 103.8 g of n-butyl methacrylate, 2.50 g of sodium dioctylsulfosuccinate and 87.5 g of purified water) was added dropwise to the seed particle dispersion over a period of 2.5 hours, and then stirring was continued at 80° C. for 1 hour to obtain a core particle polymer dispersion.

Next, a monomer emulsion (a stirred, emulsified mixture of 184.5 g of methyl methacrylate, 32.7 g of n-butyl methacrylate, 32.7 g of glycidyl methacrylate, 1.25 g of sodium dioctylsulfosuccinate, 5.00 g of polyoxyethylene lauryl ether (EMULGEN 106, trade name of Kao Corp.) and 87.5 g of purified water) was added dropwise to the polymer dispersion over a period of 2.5 hours, and then stirring was continued at 80° C. for 1 hour to obtain a core/shell particle polymer dispersion.

After cooling the obtained polymer dispersion to room temperature, a spray drier was used for spray drying at an inlet temperature of 170° C., an outlet temperature of 75° C. and an atomizer speed of 25,000 rpm, to obtain polymer fine particles (A5). Table 1 shows the results of evaluating the obtained polymer fine particles (A5).

PRODUCTION EXAMPLE 6

Preparation of Polymer Fine Particles (A6)

The procedure described in Production Example 5 was repeated, except that the monomer for the dropwise added monomer emulsion had the composition shown in Table 1 at 250 g each, to obtain polymer fine particles (A6).

Table 1 shows the results of evaluating the obtained polymer fine particles (A6).

TABLE 1

| Polymer fine particles | Core composition (mole %) | Shell composition (mole %) | Copolymerization of monomer with functional group | Weight-average molecular weight |
|---|---|---|---|---|
| A1 | MMA/GMA = 70/30 | — | 30 | 802,000 |
| A2 | MMA/n-BMA/GMA = 60/20/20 | — | 20 | 884,000 |
| A3 | MMA/n-BMA/GMA = 80/10/10 | — | 10 | 916,000 |
| A4 | MMA/n-BMA = 60/40 | — | 0 | 764,000 |
| A5 | MMA/n-BMA = 60/40 | MMA/n-BMA/GMA = 80/10/10 | Core: 0 Shell: 10 | 784,000 |
| A6 | MMA/n-BMA = 60/40 | MMA/GMA = 70/30 | Core: 0 Shell: 30 | 835,000 |

The abbreviations in the table are as follows.
MMA: Methyl methacrylate
GMA: Glycidyl methacrylate
n-BMA: n-Butyl methacrylate

EXAMPLE 1

After adding 100 parts of diisononyl phthalate (hereunder, DINP) as a plasticizer to 100 parts of polymer fine particles (A1), the mixture was stirred with a disper mixer, defoamed under reduced pressure and then heated in an oven at 140° C. for 30 minutes; as a result, the polymer fine particles (A1) did not dissolve but were incompatible with the DINP.

Next, there were added 51 parts of di-(2-ethylhexyl)amine as a reactive component (C) for chemical conversion to compatibility and 151 parts of DINP to 100 parts of the polymer fine particles (A1), and the mixture was stirred with a disper mixer and defoamed under reduced pressure to obtain a homogeneous plastisol composition. The evaluation results are shown in Table 2.

The obtained plastisol composition was coated onto a glass plate to a thickness of 2 mm and heated at 140° C. for 30 minutes for gelling to obtain a uniform coating. The evaluation results are shown in Table 2.

EXAMPLE 2

After adding 100 parts of DINP as a plasticizer to 100 parts of polymer fine particles (A2), the mixture was stirred with a disper mixer, defoamed under reduced pressure and then heated in an oven at 140° C. for 30 minutes; as a result, the polymer fine particles (A2) did not dissolve but were incompatible with the DINP.

Next, there were added 40 parts of oleic acid as a reactive component (C) for chemical conversion to compatibility, 2 parts of tributylaluminum bromide as a reaction catalyst and 140 parts of DINP to 100 parts of the polymer fine particles (A2), and the mixture was stirred with a disper mixer and defoamed under reduced pressure to obtain a homogeneous plastisol composition.

A uniform coating was then obtained in the same manner as Example 1.

EXAMPLE 3

After adding 100 parts of DINP as a plasticizer to 100 parts of polymer fine particles (A2), the mixture was stirred with a disper mixer, defoamed under reduced pressure and then heated in an oven at 140° C. for 30 minutes; as a result, the polymer fine particles (A2) did not dissolve but were incompatible with the DINP.

Next, there were added 40 parts of isostearic acid (DIADOL 18GA, trade name of Mitsubishi Chemical Co., Ltd.) as a reactive component (C) for chemical conversion to compatibility, 2 parts of tributylaluminum bromide as a reaction catalyst and 140 parts of DINP as a plasticizer to 100 parts of the polymer fine particles (A2), and the mixture was stirred with a disper mixer and defoamed under reduced pressure to obtain a homogeneous plastisol composition.

A uniform coating was then obtained in the same manner as Example 1.

EXAMPLE 4

After adding 100 parts of DINP as a plasticizer to 100 parts of polymer fine particles (A3) having the same components and composition as the outermost layer component of the polymer fine particles (A5), the mixture was stirred with a disper mixer, defoamed under reduced pressure and then heated in an oven at 140° C. for 30 minutes; as a result, the polymer fine particles (A3) did not dissolve but were incompatible with the DINP.

Next, there were added 10 parts of oleic acid as a reactive component (C) for chemical conversion to compatibility, 1 part of 1,2-dimethylimidazole as a reaction catalyst and 110 parts of DINP to 100 parts of polymer fine particles (A5), and the mixture was stirred with a disper mixer and defoamed under reduced pressure to obtain a homogeneous plastisol composition.

A uniform coating was then obtained in the same manner as Example 1.

EXAMPLE 5

The procedure described in Production Example 4 was repeated, except that the conditions for heating and gelling of the plastisol composition were 160° C. for 20 minutes, to obtain a uniform coating. The evaluation results are shown in Table 2.

EXAMPLE 6

The procedure described in Production Example 4 was repeated, except that the conditions for heating and gelling of the plastisol composition were 180° C. for 10 minutes, to obtain a uniform coating. The evaluation results are shown in Table 2.

EXAMPLE 7

After adding 100 parts of a benzoic acid ester-based plasticizer (B-510, trade name of Toho Rika Kogyo Co., Ltd.) to 100 parts of polymer fine particles (A1) having the same components and composition as the outermost layer component of the polymer fine particles (A6), the mixture was stirred with a disper mixer, defoamed under reduced pressure and then heated in an oven at 140° C. for 30 minutes; as a result, the polymer fine particles (A1) did not dissolve but were incompatible with the benzoic acid ester-based plasticizer.

Next, there were added 30 parts of oleic acid as a reactive component (C) for chemical conversion to compatibility, 1 part of 1,2-dimethylimidazole as a reaction catalyst and 130 parts of the benzoic acid ester-based plasticizer to 100 parts of polymer fine particles (A6), and the mixture was stirred with a disper mixer and defoamed under reduced pressure to obtain a homogeneous plastisol composition.

A uniform coating was then obtained in the same manner as Example 1.

EXAMPLE 8

After adding 100 parts of a phenyl alkylsulfonate (MESAMOLL, trade name of Bayer AG) as a plasticizer to 100 parts of polymer fine particles (A1) having the same components and composition as the outermost layer component of the polymer fine particles (A6), the mixture was stirred with a disper mixer, defoamed under reduced pressure and then heated in an oven at 140° C. for 30 minutes; as a result, the polymer fine particles (A1) did not dissolve but were incompatible with the MESAMOLL.

Next, there were added 30 parts of oleic acid as a reactive component (C) for chemical conversion to compatibility, 1 part of 1,2-dimethylimidazole as a reaction catalyst and 130 parts of MESAMOLL to 100 parts of polymer fine particles (A6), and the mixture was stirred with a disper mixer and defoamed under reduced pressure to obtain a homogeneous plastisol composition.

A uniform coating was then obtained in the same manner as Example 1.

COMPARATIVE EXAMPLE 1

After adding 100 parts of DINP1 as a plasticizer to 100 parts of polymer fine particles (A5), the mixture was stirred with a disper mixer and then defoamed under reduced pressure to obtain a homogeneous plastisol composition.

A uniform coating was then obtained in the same manner as Example 1.

COMPARATIVE EXAMPLE 2

After adding 100 parts of DINP1 as a plasticizer to 100 parts of polymer fine particles (A4), the mixture was stirred with a disper mixer and then defoamed under reduced pressure to obtain a homogeneous plastisol composition. The composition gelled during the storage stability test, and thus exhibited poor storage stability.

A uniform coating was then obtained in the same manner as Example 1.

COMPARATIVE EXAMPLE 3

After adding 100 parts of DINP1 as a plasticizer to 100 parts of polymer fine particles (A1), the mixture was stirred with a disper mixer and then defoamed under reduced pressure to obtain a homogeneous plastisol composition.

The obtained plastisol composition was coated onto a glass plate to a thickness of 2 mm, and was then heated to 160° C. for 30 minutes and gelled. When the obtained coating was cooled to room temperature and allowed to stand for 24 hours, bleed-out of the plasticizer was observed, indicating poor plasticizer retention.

TABLE 2

| | Plastisol composition | | | | | Evaluation results | | | | | | |
|---|---|---|---|---|---|---|---|---|---|---|---|---|
| | Polymer fine particles (A) | Plasticizer | Reactive component (C) | Heating conditions | Polymer Evaluation of compatibility with plasticizer Top: Conditions for no chemical change Bottom: Conditions for chemical change (Top only for Comp. Exs. 1–3) | Plastisol composition | | | Coating | | |
| | | | | | | Initial viscosity (Pa·s) | Storage stability Thickening rate (%) | Storage stability Judgement | Plasticizer retention | Strength (MPa) | Rubber elasticity (%) | Judgment |
| Example 1 | A1 100 parts | DINP 100 pts | — | 140° C., 30 min. | Incompatible | 0.8 | 25 | ◉ | ○ | 3.5 | 62 | ○ |
| | A1 100 Parts | DINP 151 pts | Di-(2-ethylhexyl)amine 51 pts | 140° C., 30 min. | Compatible | | | | | | | |
| Example 2 | A2 100 parts | DINP 100 pts | — | 140° C., 30 min. | Incompatible | 1.3 | 28 | ◉ | ○ | 2.8 | 59 | ○ |
| | A2 100 parts | DINP 140 pts | Oleic acid 40 pts | 140° C., 30 min. | Compatible | | | | | | | |
| Example 3 | A2 100 parts | DINP 100 pts | — | 140° C., 30 min. | Incompatible | 3.1 | 32 | ◉ | ○ | 3.3 | 64 | ○ |
| | A2 100 parts | DINP 140 pts | Isostearic acid 40 pts | 140° C., 30 min. | Compatible | | | | | | | |
| Example 4 | A3 100 parts | DINP 100 pts | — | 140° C., 30 min. | Core: Compatible Shell: Incompatible | 1.2 | 32 | ◉ | ○ | 1.2 | 71 | ◉ |
| | A5 100 parts | DINP 110 pts | Oleic acid 10 pts | 140° C., 30 min. | Core: Compatible Shell: Compatible | | | | | | | |
| Example 5 | A3 100 parts | DINP 100 pts | — | 160° C., 20 min. | Core: Compatible Shell: Incompatible | 1.2 | 32 | ◉ | ○ | 0.9 | 73 | ◉ |
| | A5 100 parts | DINP 110 pts | Oleic acid 10 pts | 160° C., 20 min. | Core: Compatible Shell: Compatible | | | | | | | |
| Example 6 | A3 100 parts | DINP 100 pts | — | 180° C., 10 min. | Core: Compatible Shell: Incompatible | 1.2 | 32 | ◉ | ○ | 1.0 | 73 | ◉ |
| | A5 100 parts | DINP 110 pts | Oleic acid 10 pts | 180° C., 10 min. | Core: Compatible Shell: Compatible | | | | | | | |
| Example 7 | A1 100 parts | B-510 100 pts | — | 140° C., 30 min. | Core: Compatible Shell: Incompatible | 1.5 | 42 | ○ | ○ | 1.1 | 69 | ○ |
| | A6 100 parts | B-510 100 pts | Oleic acid 30 pts | 140° C., 30 min. | Core: Compatible Shell: Compatible | | | | | | | |
| Example 8 | A1 100 parts | MESAMOLL 100 pts | — | 140° C., 30 min. | Core: Compatible Shell: Incompatible | 2.6 | 25 | ◉ | ○ | 1.1 | 70 | ◉ |
| | A1 100 parts | MESAMOLL 130 pts | Oleic acid 30 pts | 140° C., 30 min. | Core: Compatible Shell: Compatible | | | | | | | |
| Comp. Ex. 1 | A5 100 parts | DINP 100 pts | — | 140° C., 30 min. | Core: Compatible Shell: Incompatible | 1.8 | 38 | ◉ | ○ | 3.1 | 23 | × |
| Comp. Ex. 2 | A4 100 parts | DINP 100 pts | — | 140° C., 30 min. | Compatible | gelled | *1 | × | ○ | 0.8 | 75 | ◉ |
| Comp. Ex. 3 | A1 100 parts | DINP 100 pts | — | 160° C., 30 min. | Incompatible | 1.6 | 18 | ◉ | × | *1 | *1 | × |

The abbreviations in the table are as follows.

A1: Polymer fine particles obtained in Production Example 1
A2: Polymer fine particles obtained in Production Example 2
A3: Polymer fine particles obtained in Production Example 3
A4: Polymer fine particles obtained in Production Example 4
A5: Polymer fine particles obtained in Production Example 5
A6: Polymer fine particles obtained in Production Example 6
DINP: Diisononyl phthalate
B-510: Benzoic acid ester-based plasticizer (B-510, trade name of Toho Rika Kogyo Co., Ltd.)
MESAMOLL: Phenyl alkylsulfonate (MESAMOLL, trade name of Bayer AG)
*1: Unmeasurable Examples 1 to 3 are examples of using epoxy group-containing homogeneously structured particles as the polymer fine particles, which are converted to compatibility by reaction of a secondary amine or carboxylic acid with the epoxy group. When no reactive component is included, heating produces no film, and as a result all of the particles were incompatible with the plasticizers. In contrast, the plastisol compositions obtained by adding epoxy group-reactive components exhibited a low thickening rate and satisfactory storage stability. Also, the coatings obtained by hot film formation exhibited satisfactory rubber elasticity.

Examples 4 to 8 employed polymer fine particles with a core/shell structure which was not homogeneous. The shell portions as the outermost layers of the polymer fine particles were incompatible with the plasticizers. The plastisol compositions obtained by adding epoxy group-reactive components exhibited a low thickening rate and satisfactory storage stability. Also, the coatings obtained by hot film formation exhibited satisfactory rubber elasticity.

Comparative Example 1 is an example of a plastisol composition employing polymer fine particles with a core/shell structure. The storage stability of this plastisol composition was satisfactory. However, the coating obtained by hot film formation of the plastisol composition contained residue of the component which was incompatible with the plasticizer, and therefore the rubber elasticity of the coating was unsatisfactory.

Comparative Example 2 is an example of a plastisol composition employing polymer fine particles with a homogeneous structure which was compatible with the plasticizer. The physical properties of the coating obtained by hot film formation of this plastisol composition were satisfactory, but the plastisol composition gelled during evaluation of the storage stability, thereby indicating poor storage stability.

Comparative Example 3 is an example of a plastisol composition employing polymer fine particles with a homogeneous structure including epoxy group side chains. Although the storage stability of this plastisol composition was satisfactory, the coating obtained by hot film formation contained residue of the component which was incompatible with the plasticizer and, therefore, bleed-out of the plasticizer was observed after film formation and a uniform coating was not obtained.

INDUSTRIAL APPLICABILITY

According to the invention, it is possible to provide a plastisol composition employing a non-halogenated polymer which emits no substances such as hydrogen chloride gas or dioxins during incineration and having satisfactory storage stability and molded product properties, and the effect is therefore notable in terms of industrial advantage and environmental conservation.

The invention claimed:

1. A plastisol composition comprising:
    (A) polymer fine particles comprising a derivatized polymer (a1') and
    (B) a plasticizer
    wherein the derivatized polymer (a1') is obtained by heating a polymer (a1) with a reactive component
    wherein the polymer (a1) is incompatible with the plasticizer (B) and the derivatized polymer (a1') is compatible with the plasticizer (B).

2. A plastisol composition according to claim 1, wherein the polymer (a1) is a polymer with at least one type of reactive functional group.

3. A plastisol composition according to claim 1, wherein an outermost layer of the polymer fine particles (A) consists of the derivatized polymer (a1').

4. A plastisol composition according to claim 1, wherein the polymer fine particles (A) have a simple structure consisting of the derivatized polymer (a1').

5. A plastisol composition according to claim 1, wherein the polymer fine particles (A) have a core/shell structure, wherein the shell portion comprises the derivatized polymer (a1').

6. A plastisol composition according to claim 1, wherein the polymer (a1) has an epoxy group side chain, and the reactive component (C) is a nucleophile or electrophile.

7. A plastisol composition according to claim 1, wherein the polymer (a1) comprises an acrylic-based polymer.

8. A molded product obtained by hot molding a plastisol composition according to claim 1.

9. An article having a coating which is prepared by heating a plastisol composition according to claim 1.

10. An article having a coating which is prepared by heating a plastisol composition according to claim 2.

11. An article having a coating which is prepared by heating a plastisol composition according to claim 3.

12. An article having a coating which is prepared by heating a plastisol composition according to claim 4.

13. An article having a coating which is prepared by heating a plastisol composition according to claim 5.

14. An article having a coating which is prepared by heating a plastisol composition according to claim 6.

15. A molded product prepared by hot molding a plastisol composition according to claim 2.

16. A molded product prepared by hot molding a plastisol composition according to claim 3.

17. A molded product prepared by hot molding a plastisol composition according to claim 4.

18. A molded product prepared by hot molding a plastisol composition according to claim 5.

19. A molded product prepared by hot molding a plastisol composition according to claim 6.

* * * * *